United States Patent
Kitamura et al.

(10) Patent No.: US 11,472,967 B1
(45) Date of Patent: Oct. 18, 2022

(54) ANTIFOULING COATING COMPOSITION AND COATING FILM

(71) Applicant: NIPPON PAINT MARINE COATINGS CO., LTD., Osaka (JP)

(72) Inventors: Wataru Kitamura, Osaka (JP); Soichiro Tomiyama, Osaka (JP); Yasuhisa Nagase, Osaka (JP)

(73) Assignee: NIPPON PAINT MARINE COATINGS CO., LTD., Osaka (JP)

( * ) Notice: Subject to any disclaimer, the term of this patent is extended or adjusted under 35 U.S.C. 154(b) by 0 days.

(21) Appl. No.: 17/607,158

(22) PCT Filed: May 19, 2021

(86) PCT No.: PCT/JP2021/018986
§ 371 (c)(1),
(2) Date: Oct. 28, 2021

(51) Int. Cl.
*C09D 5/16* (2006.01)
*C09D 133/14* (2006.01)
*C09D 133/06* (2006.01)

(52) U.S. Cl.
CPC ......... *C09D 5/1668* (2013.01); *C09D 5/1618* (2013.01); *C09D 5/1625* (2013.01); *C09D 5/1687* (2013.01); *C09D 133/062* (2013.01); *C09D 133/14* (2013.01)

(58) Field of Classification Search
None
See application file for complete search history.

(56) References Cited

FOREIGN PATENT DOCUMENTS

| | | | | |
|---|---|---|---|---|
| EP | 2 128 208 A1 | 12/2009 | | |
| JP | 2001-106962 A | 4/2001 | | |
| JP | 2006-503115 A | 1/2006 | | |
| JP | 2006503115 A | * | 1/2006 | ............... C09D 5/16 |
| JP | 2016-214840 A | 12/2016 | | |
| JP | 2016214840 A | * | 12/2016 | |
| JP | 2018-009136 A | 1/2018 | | |
| JP | 2021-050251 A | 4/2021 | | |
| JP | 2021050251 A | * | 4/2021 | ............ C08F 220/10 |
| WO | 03/070832 A2 | 8/2003 | | |
| WO | WO-03070832 A2 | * | 8/2003 | ........... C09D 5/1668 |
| WO | 2008/105122 A1 | 9/2008 | | |
| WO | 2019/198676 A1 | 10/2019 | | |
| WO | 2020/235516 A1 | 11/2020 | | |

OTHER PUBLICATIONS

Fox Equation Tg Datasheet (Year: 2022).*
International Search Report for PCT/JP2021/018986 dated Jul. 20, 2021 (PCT/ISA/210).

* cited by examiner

*Primary Examiner* — Robert T Butcher
(74) *Attorney, Agent, or Firm* — Sughrue Mion, PLLC

(57) ABSTRACT

Provided is an antifouling coating composition containing a hydrolyzable resin (A), a first non-hydrolyzable resin (B), a second non-hydrolyzable resin (C), and an antifouling agent (D), in which a glass transition temperature $Tg_B$ [° C.] and a solubility parameter $SP_B$ of the first non-hydrolyzable resin (B), and a glass transition temperature $Tg_C$ [° C.] and a solubility parameter $SP_C$ of the second non-hydrolyzable resin (C) satisfy an expression [1]:$Tg_B-Tg_C \geq 60$, an expression [2]:$SP_B \geq 9.5$, an expression [3]:$SP_C \geq 9.5$, and an expression [4]:$|SP_B-SP_C| \leq 1.0$.

12 Claims, 3 Drawing Sheets

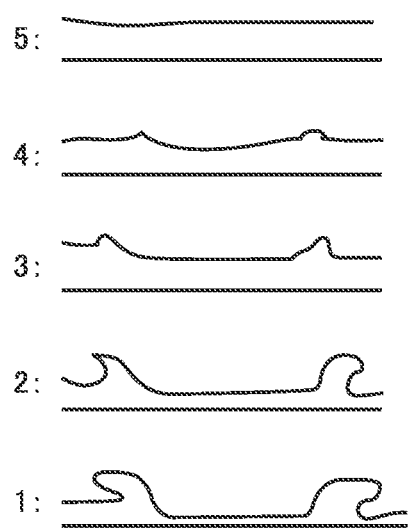

ANTIFOULING COATING COMPOSITION AND COATING FILM

CROSS REFERENCE TO RELATED APPLICATIONS

This application is a National Stage of International Application No. PCT/JP2021/018986 filed May 19, 2021.

TECHNICAL FIELD

The present invention relates to an antifouling coating composition and a coating film. The present invention also relates to a ship, an underwater structure, and the like having the coating film.

BACKGROUND ART

Aquatic organisms, such as barnacles, mussels, and algae, are likely to adhere to underwater structures, ships, fishing nets, and the like. Due to such adhesion of organisms, efficient operation is hindered in a ship or the like, which causes problems such as waste of fuel. In addition, fish nets and the like have problems such as clogging and shortening of service life. Therefore, in order to prevent adhesion of aquatic organisms, it has been conventionally carried out to form an antifouling coating film by applying an antifouling coating composition to the surface.

Examples of antifouling coating compositions that have been used include an antifouling coating composition containing a triorganosilyl group-containing hydrolyzable resin (binder resin) and an antifouling agent (e.g., WO 2020/235516 (PTL 1)). Since the surface of an antifouling coating film formed of this antifouling coating composition is always renewed as the triorganosilyl group is gradually hydrolyzed in water, the antifouling coating film can exhibit antifouling performance over a long term.

CITATION LIST

Patent Literature

PTL 1: WO 2020/235516 A1

SUMMARY OF INVENTION

Technical Problem

An object of the present invention is to provide an antifouling coating composition containing a hydrolyzable resin and an antifouling agent, which can exhibit high antifouling performance for a long term. Another object of the present invention is to provide a coating film formed from the antifouling coating composition, and a ship and an underwater structure having the coating film.

Solution To Problem

The present invention provides the following antifouling coating composition, coating film, ship, and underwater structure.

[1] An antifouling coating composition containing a hydrolyzable resin (A), a first non-hydrolyzable resin (B), a second non-hydrolyzable resin (C), and an antifouling agent (D), in which
a glass transition temperature $Tg_B$ [° C.] and a solubility parameter $SP_B$ of the first non-hydrolyzable resin (B), and a glass transition temperature $Tg_C$ [° C.] and a solubility parameter $SP_C$ of the second non-hydrolyzable resin (C) satisfy following expressions [1] to [4]:

$$Tg_B - Tg_C \geq 60 \qquad [1]$$

$$SP_B \geq 9.5 \qquad [2]$$

$$SP_C \geq 9.5 \qquad [3]$$

$$|SP_B - SP_C| \leq 1.0 \qquad [4]$$

[2] The antifouling coating composition according to [1], in which the $Tg_B$ is in a range of greater than or equal to 40° C. and less than or equal to 80° C., and the $SP_B$ is in a range of greater than or equal to 9.6 and less than or equal to 10.3.

[3] The antifouling coating composition according to [1] or [2], in which the $Tg_C$ is in a range of greater than or equal to −50° C. and less than or equal to −20° C., and the $SP_C$ is in a range of greater than or equal to 9.8 and less than or equal to 10.6.

[4] The antifouling coating composition according to any one of [1] to [3], in which the hydrolyzable resin (A) has a glass transition temperature $Tg_A$ in a range of greater than or equal to 10° C. and less than or equal to 80° C., and a solubility parameter $SP_A$ in a range of greater than or equal to 8.5 and less than or equal to 9.7.

[5] The antifouling coating composition according to any one of [1] to [4], in which the hydrolyzable resin (A) has a silicon atom-containing group represented by a following formula (1):

[Chemical formula 1]

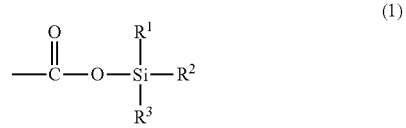

[In formula (1), $R^1$, $R^2$, and $R^3$ each independently represent a C1 to C6 hydrocarbon group.]

[6] The antifouling coating composition according to any one of [1] to [5], further containing a rosin compound (E).

[7] The antifouling coating composition according to any one of [1] to [6], in which a content ratio of the first non-hydrolyzable resin (B) to the hydrolyzable resin (A) is greater than or equal to 0.1 and less than or equal to 0.45 in terms of mass ratio.

[8] The antifouling coating composition according to any one of [1] to [7], in which a content ratio of the second non-hydrolyzable resin (C) to the hydrolyzable resin (A) is greater than or equal to 0.05 and less than or equal to 0.65 in terms of mass ratio.

[9] The antifouling coating composition according to any one of [1] to [8], in which a content of the antifouling agent (D) is greater than or equal to 0.3 parts by mass and less than or equal to 550 parts by mass based on 100 parts by mass of the hydrolyzable resin (A).

[10] A coating film formed from the antifouling coating composition according to any one of [1] to [9].

[11] A ship having the coating film according to [10].

[12] An underwater structure having the coating film according to [10].

Advantageous Effects Of Invention

An antifouling coating composition containing a hydrolyzable resin and an antifouling agent and being able to exhibit high antifouling performance for a long term can be provided. In addition, a coating film formed from the antifouling coating composition, and a ship and an underwater structure having the coating film can be provided.

BRIEF DESCRIPTION OF DRAWINGS

FIG. 3 is cross-sectional views each schematically showing a state of a coating film corresponding to each evaluation criterion for evaluation of a drying property of a coating film.

DESCRIPTION OF EMBODIMENTS

Antifouling Coating Composition

Figure 1:
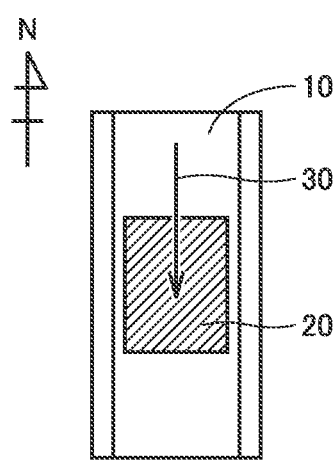
FIG. 1 is a schematic top view illustrating a method for evaluating a dynamic antifouling property of a coating film.

An antifouling coating composition according to the present invention (hereinafter, also simply referred to as an "antifouling coating composition") contains a hydrolyzable resin (A), a first non-hydrolyzable resin (B), a second non-hydrolyzable resin (C), and an antifouling agent (D). Each of hydrolyzable resin (A), first non-hydrolyzable resin (B), and second non-hydrolyzable resin (C) is a polymer compound, that is, a polymer in which monomers are polymerized.

In the present description, the "hydrolyzable resin" refers to a resin having at least one hydrolyzable group selected from the group consisting of a group represented by formula (1), a group represented by formula (2), and a group represented by formula (3). The "non-hydrolyzable resin" refers to a resin that does not have a group represented by formula (1), a group represented by formula (2), and a group represented by formula (3). An antifouling coating film formed from the antifouling coating composition containing hydrolyzable resin (A) exhibits antifouling performance because a hydrolyzable group of hydrolyzable resin (A) is gradually hydrolyzed in water to renew a surface of the coating film, and accordingly, an antifouling component derived from antifouling agent (D) is released into water.

In a conventional antifouling coating composition containing a hydrolyzable resin and an antifouling agent, in order to impart high antifouling performance to an antifouling coating film formed therefrom, the antifouling coating composition has been required to be designed such that a consumption rate of the antifouling coating film in water is relatively high. In this case, however, the antifouling coating film cannot maintain antifouling performance for a long term. This is because the antifouling coating film disappears early.

Hereinafter, a property of a coating film exhibiting high antifouling performance over a long term is also referred to as a "long-term antifouling property" of the coating film.

Since the antifouling coating composition according to the present invention contains predetermined first non-hydrolyzable resin (B) and predetermined second non-hydrolyzable resin (C) in addition to hydrolyzable resin (A) and antifouling agent (D), the antifouling component derived from antifouling agent (D) can be efficiently released from the antifouling coating film into water. As a result, the antifouling coating film according to the present invention can exhibit high antifouling performance even when the coating film has a low consumption rate while being immersed in water. That is, according to the present invention, both a low consumption rate (long-term antifouling property) of the coating film and high antifouling performance can be achieved.

[1] Hydrolyzable Resin (A)

The antifouling coating composition contains one or more hydrolyzable resins (A). Hydrolyzable resin (A) has at least one hydrolyzable group selected from the group consisting of a group represented by formula (1), a group represented by formula (2), and a group represented by formula (3).

[Chemical formula 2]

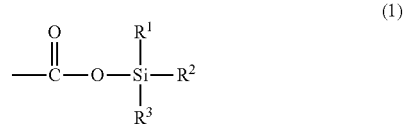

(1)

[In formula (1), $R^1$, $R^2$, and $R^3$ each independently represent a C1 to C6 hydrocarbon group.]

[Chemical formula 3]

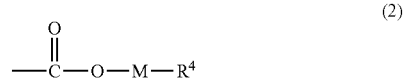

(2)

[in formula (2), M represents a divalent metal atom, and $R^4$ represents an organic acid residue or an alcohol residue.]

[Chemical formula 4]

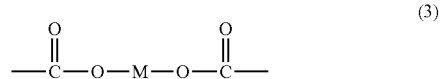

(3)

[in formula (3), M represents a divalent metal atom.]

Hydrolyzable resin (A) is not particularly limited, but a (meth)acrylic resin having a hydrolyzable group can be suitably used. The hydrolyzable group may be arranged in a side chain of a polymer of the (meth)acrylic resin.

In the present description, the "(meth)acrylic resin" means a resin whose at least a part is composed of a constituent unit derived from (meth)acrylic acid or a derivative thereof (one example is (meth)acrylic acid ester). The derivative of the (meth)acrylic acid also includes a (meth)acrylic acid metal salt.

In the present description, the "(meth)acrylic" means at least one selected from methacrylic and acrylic.

In the present description, the "(meth)acryloyl" means at least one selected from methacryloyl and acryloyl.

In the present description, the "(meth)acrylic monomer" means a polymerizable monomer having a (meth)acryloyl group or a (meth)acryloyloxy group.

Examples Of Hydrolyzable Resin (A) Include a hydrolyzable resin (A1) that is a (meth)acrylic resin having only a group represented by formula (1) as the hydrolyzable group;

a hydrolyzable resin (A2) that is a (meth)acrylic resin having a group represented by formula (1) and a group represented by formula (2) and/or a group represented by formula (3) as the hydrolyzable group; and a hydrolyzable resin (A3) that is a (meth)acrylic resin having only a group represented by formula (2) and/or a group represented by formula (3) as the hydrolyzable group.

Hydrolyzable resin (A) may contain one or more resins selected from hydrolyzable resins (A1) to (A3).

From the viewpoint of achieving both a low consumption rate of a coating film and high antifouling performance, hydrolyzable resin (A) preferably contains hydrolyzable resin (A1) or hydrolyzable resin (A2), and more preferably is hydrolyzable resin (A1) or hydrolyzable resin (A2).

Examples of hydrolyzable resin (A1) include a copolymer of a polymerizable monomer (a1) having a group represented by formula (1) and another polymerizable monomer (a2) copolymerizable with polymerizable monomer (a1). The copolymer may be a random copolymer. Polymerizable monomer (a1) and polymerizable monomer (a2) may each be used alone or in combination of two or more. Hydrolyzable resin (A1) can be obtained by copolymerizing polymerizable monomer (a1) and polymerizable monomer (a2) in the presence of a radical polymerization initiator.

Polymerizable monomer (a1) and polymerizable monomer (a2) are preferably (meth)acrylic monomers.

Examples of polymerizable monomer (a1) include a radically polymerizable (meth)acrylic monomer represented by formula (4).

[Chemical formula 5]

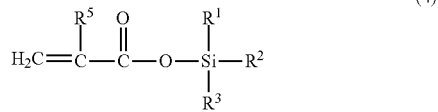

(4)

[In formula (4), $R^1$, $R^2$, and $R^3$ each independently represent a C1 to C6 hydrocarbon group. $R^5$ represents a hydrogen atom or a methyl group.]

Examples of the (meth)acrylic monomer represented by formula (4) include trimethylsilyl (meth)acrylate, triethylsilyl (meth)acrylate, tri-n-propylsilyl (meth)acrylate, triisopropylsilyl (meth)acrylate, diisopropyl-sec-butylsilyl (meth)acrylate, diisopropylisobutylsilyl (meth)acrylate, diisopropyl-tert-butylsilyl (meth)acrylate, diisopropylhexylsilyl (meth)acrylate, diisopropylphenylsilyl (meth)acrylate, isopropyl-di-sec-butylsilyl (meth)acrylate, isopropyldiisobutylsilyl (meth)acrylate, isopropyl di-tert-butylsilyl (meth)acrylate, isopropyldiphenylsilyl (meth)acrylate, diphenylhexylsilyl (meth)acrylate, tri-sec-butylsilyl (meth)acrylate, triisobutylsilyl (meth)acrylate, tri-tert-butylsilyl (meth)acrylate, tert-butyldiphenylsilyl (meth)acrylate, triphenylsilyl (meth)acrylate, tricyclohexylsilyl (meth)acrylate, dicyclohexylbenzylsilyl (meth)acrylate, diisopropylcyclohexylsilyl (meth)acrylate, and isopropyldicyclohexylsilyl (meth)acrylate.

The (meth)acrylic monomers represented by formula (4) may be used alone or in combination of two or more.

From the viewpoint of achieving both a low consumption rate of a coating film and high antifouling performance, $R^1$, $R^2$, and $R^3$ in formula (1) and formula (4) each independently is preferably a C1 to C6 alkyl group, more preferably a C1 to C4 alkyl group, and still more preferably a C3 or C4 alkyl group.

From the viewpoint of achieving both a low consumption rate of a coating film and high antifouling performance, at least one of $R^1$, $R^2$, and $R^3$ in formula (1) and formula (4) is preferably a C3 alkyl group and more preferably an isopropyl group; at least two of $R^1$, $R^2$, and $R^3$ are still more preferably isopropyl groups; and all of $R^1$, $R^2$, and $R^3$ are yet still more preferably isopropyl groups.

Polymerizable monomer (a1) may be a monomer other than the (meth)acrylic monomer represented by formula (4).

The monomer other than the (meth)acrylic monomer represented by formula (4) may be used alone or in combination of two or more. The (meth)acrylic monomer represented by formula (4) and other monomers may be used in combination. Polymerizable monomer (a1) preferably includes the (meth)acrylic monomer represented by formula (4).

Examples of the monomer other than the (meth)acrylic monomer represented by formula (4) include maleic acid diester having a group represented by formula (1). Also, as to $R^1$, $R^2$, and $R^3$ in the group represented by formula (1) that the maleic acid diester has, the above description of formula (1) is cited.

Examples of the maleic acid diester include bis(triisopropylsilyl)maleate, triisopropylsilyl methyl maleate, triisopropylsilyl ethyl maleate, triisopropylsilyl n-butyl maleate, triisopropylsilyl sec-butyl maleate, triisopropylsilyl isobutyl maleate, triisopropylsilyl tert-butyl maleate, triisopropylsilyl n-pentyl maleate, triisopropylsilyl isopentyl maleate (triisopropylsilyl isoamyl maleate), and triisopropylsilyl cyclohexyl maleate.

Examples Of Polymerizable Monomer (a2) Include (meth)acrylic acid alkyl esters having 1 to 20 (preferably 1 to 8) carbon atoms in an ester moiety, such as methyl (meth)acrylate, ethyl (meth)acrylate, isopropyl (meth)acrylate, n-butyl (meth)acrylate, isobutyl (meth)acrylate, tert-butyl (meth)acrylate, n-hexyl (meth)acrylate, 2-ethylhexyl (meth)acrylate, octyl (meth)acrylate, lauryl (meth)acrylate, and stearyl (meth)acrylate;

hydroxyl group-containing (meth)acrylic acid alkyl esters having 1 to 20 (preferably 1 to 8) carbon atoms in an ester moiety, such as 2-hydroxyethyl (meth)acrylate, 2-hydroxypropyl (meth)acrylate, 3-hydroxypropyl (meth)acrylate, and 4-hydroxybutyl (meth)acrylate;

alkoxyalkyl (meth)acrylates, such as methoxyethyl (meth)acrylate and ethoxyethyl (meth)acrylate;

(meth)acrylic monomers containing an oxyalkylene chain, such as methoxy polyethylene glycol (meth)acrylate (the number of repetitions of $-OC_2H_4-$ is, for example, 2 to 9);

(meth)acrylic acid cyclic hydrocarbon esters, such as phenyl (meth)acrylate, benzyl (meth)acrylate, cyclohexyl (meth)acrylate, and methylcyclohexyl (meth)acrylate;

unsaturated monobasic acids, such as (meth)acrylic acid, cinnamic acid, and crotonic acid;

unsaturated dibasic acids and monoalkyl esters thereof, such as maleic acid, fumaric acid, itaconic acid, and monoalkyl esters thereof;

dibasic acid adducts of unsaturated monobasic acid hydroxyalkyl esters, such as maleic acid adducts of 2-hydroxyethyl (meth)acrylate, phthalic acid adducts of 2-hydroxyethyl (meth)acrylate, and succinic acid adducts of 2-hydroxyethyl (meth)acrylate; and other polymerizable vinyl compounds, such as (meth)acrylamide, (meth)acrylonitrile, styrene, a-methylstyrene, o-, m-, or p-methylstyrene, vinyl acetate, vinyl propionate, vinyl benzoate, and vinyl toluene.

A content of the constituent unit derived from polymerizable monomer (a1) in hydrolyzable resin (A1) is preferably greater than or equal to 20 mass %, more preferably greater than or equal to 30 mass %, still more preferably greater than or equal to 40 mass %, and may be greater than or equal to 50 mass % or 60 mass %, based on 100 mass % of hydrolyzable resin (A1), from the viewpoint of enhancing the antifouling performance of the antifouling coating film. The content is preferably less than or equal to 80 mass %, more preferably less than or equal to 75 mass %, still more preferably less than or equal to 70 mass %, and yet still more preferably less than or equal to 65 mass %, based on 100 mass % of hydrolyzable resin (A1), from the viewpoint of achieving both a low consumption rate of a coating film and high antifouling performance. The rest of hydrolyzable resin (A1) is a constituent unit derived from polymerizable monomer (a2).

Examples of hydrolyzable resin (A2) include copolymers of polymerizable monomer (a1) having a group represented by formula (1), polymerizable monomer (a3) having a group represented by formula (2) and/or polymerizable monomer (a4) having a group represented by formula (3), and another polymerizable monomer (a2) copolymerizable with these polymerizable monomers. The copolymer may be a random copolymer. Polymerizable monomers (a1) to (a4) may each be used alone or in combination of two or more. Hydrolyzable resin (A2) can be obtained by, for example, copolymerizing polymerizable monomer (a1), polymerizable monomer(s) (a3) and/or (a4), and polymerizable monomer (a2) in the presence of a radical polymerization initiator. As to polymerizable monomers (a1) and (a2), the above description of hydrolyzable resin (A1) is cited.

Polymerizable monomers (a1) to (a4) are preferably (meth)acrylic monomers.

Examples of polymerizable monomer (a3) include a radically polymerizable (meth)acrylic monomer represented by formula (5). By using the (meth)acrylic monomer represented by formula (5), hydrolyzable resin (A2) having a group represented by formula (2) is obtained.

[Chemical formula 6]

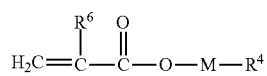

(5)

[In formula (5), M represents a divalent metal atom, $R^4$ represents an organic acid residue or an alcohol residue, and $R^6$ represents a hydrogen atom or a methyl group.]

Examples of polymerizable monomer (a4) include a radically polymerizable (meth)acrylic monomer represented by formula (6). By using the (meth)acrylic monomer represented by formula (6), hydrolyzable resin (A2) having a group represented by formula (3) is obtained. The group represented by formula (3) is a cross-linking group cross-linking polymer main chains.

[Chemical formula 7]

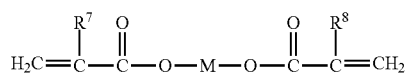

(6)

[in formula (6), M represents a divalent metal atom, and $R^7$ and $R^8$ each independently represent a hydrogen atom or a methyl group.]

Examples of the divalent metal atom M in formulae (2), (3), (5), and (6) include Mg, Zn, and Cu, and Zn or Cu is preferable. $R^4$ in formulae (2) and (5) is preferably an organic acid residue.

Examples of an organic acid forming the organic acid residue in $R^4$ include monobasic organic acids, such as acetic acid, monochloroacetic acid, monofluoroacetic acid, propionic acid, caproic acid, caprylic acid, 2-ethylhexyl acid, capric acid, versatic acid, isostearic acid, palmitic acid, cresotic acid, oleic acid, elaidic acid, linoleic acid, linolenic acid, stearolic acid, ricinoleic acid, ricinoelaidic acid, brassidic acid, erucic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalenecarboxylic acid, and pulvinic acid.

When the organic acid residue is a fatty acid residue, an antifouling coating film that causes no cracks nor peeling for a long term tends to be formed.

Examples of other organic acids that form the organic acid residues include monobasic cyclic organic acids other than aromatic organic acids. Examples of the monobasic cyclic organic acids include: organic acids having a cycloalkyl group, such as naphthenic acid; resin acids, such as tricyclic resin acids; and salts thereof.

Examples of the tricyclic resin acids include monobasic acids having a diterpene hydrocarbon skeleton. Examples of the monobasic acids having a diterpene hydrocarbon skeleton include compounds having an abietane, pimarane, isopimarane, or labdane skeleton. More concretely, the examples include abietic acid, neoabietic acid, dehydroabietic acid, hydrogenated abietic acid, parastrinic acid, pimaric acid, isopimaric acid, levopimaric acid, dextropimaric acid, sandaracopimaric acid, and salts thereof. Among them, abietic acid, hydrogenated abietic acid, and salts thereof are preferable from the viewpoint of the antifouling property and the like of the coating film.

The monobasic cyclic organic acid does not need to be highly purified, and, for example, pine resin, pine resin acid, or the like can also be used. Examples of such things include rosins, hydrogenated rosins, disproportionated rosins, and naphthenic acid. The rosins include gum rosin, wood rosin, tall oil rosin, and the like. Rosins, hydrogenated rosins, and disproportionated rosins are preferable from the viewpoints of being inexpensive and easily available, being excellent in handleability, and easily exhibiting a long-term antifouling property.

The acid value of the monobasic cyclic organic acid is preferably greater than or equal to 100 mgKOH/g and less than or equal to 220 mgKOH/g, more preferably greater than or equal to 120 mgKOH/g and less than or equal to 190 mgKOH/g, and still more preferably greater than or equal to 140 mgKOH/g and less than or equal to 185 mgKOH/g.

The organic acid residue of the monomer represented by formula (5) may be formed of one organic acid or may be formed of two or more organic acids.

Examples of the method for producing a monomer having an organic acid residue as $R^4$ include a method for reacting, in an organic solvent containing an alcohol-based compound, an inorganic metal compound, a carboxyl group-containing radically polymerizable monomer such as (meth) acrylic acid, and a non-polymerizable organic acid (organic acid constituting the organic acid residue).

The constituent unit derived from the (meth)acrylic monomer represented by formula (5) can also be formed by a method for reacting a resin obtained by polymerizing a monomer composition containing a carboxyl group-containing radically polymerizable monomer such as (meth)acrylic acid, a metal compound, and a non-polymerizable organic acid (organic acid constituting the organic acid residue).

Examples of the (meth)acrylic monomer represented by formula (6) include magnesium acrylate [$(CH_2=CHCOO)_2Mg$], magnesium methacrylate [$(CH_2=C(CH_3)COO)_2Mg$], zinc acrylate [$(CH_2=CHCOO)_2Zn$], zinc methacrylate [$(CH_2=C(CH_3)COO)_2Zn$], copper acrylate [$(CH_2=CHCOO)_2Cu$], and copper methacrylate [$(CH_2=C(CH_3)COO)_2Cu$]. One or two or more of these can be appropriately selected and used as necessary.

Examples of the method for producing the (meth)acrylic monomer represented by formula (6) include a method for reacting a polymerizable unsaturated organic acid, such as (meth)acrylic acid, and a metal compound with water in an organic solvent containing an alcohol-based compound. In this case, the content of water in the reactants is preferably adjusted to greater than or equal to 0.01 mass % and less than or equal to 30 mass %.

As to the content of the constituent unit derived from polymerizable monomer (a1) in hydrolyzable resin (A2), the above description of hydrolyzable resin (A1) is cited.

The total content of the constituent units derived from polymerizable monomers (a3) and (a4) in hydrolyzable resin (A2) is preferably greater than or equal to 1 mass %, more preferably greater than or equal to 2 mass %, and still more preferably greater than or equal to 4 mass %, and may be greater than or equal to 6 mass %, based on 100 mass % of hydrolyzable resin (A2), from the viewpoint of enhancing the antifouling performance of the antifouling coating film. The content is preferably less than or equal to 30 mass %, more preferably less than or equal to 25 mass %, and still more preferably less than or equal to 20 mass %, based on 100 mass % of hydrolyzable resin (A2), from the viewpoint of achieving both a low consumption rate of a coating film and high antifouling performance.

The content of the constituent unit derived from polymerizable monomer (a2) in hydrolyzable resin (A2) is usually greater than or equal to 0.1 mass % and less than or equal to 90 mass %, preferably greater than or equal to 5 mass % and less than or equal to 80 mass %, and still more preferably greater than or equal to 10 mass % and less than or equal to 70 mass %, based on 100 mass % of hydrolyzable resin (A2).

Examples of hydrolyzable resin (A3) include copolymers of polymerizable monomer (a3) having a group represented by formula (2) and/or polymerizable monomer (a4) having a group represented by formula (3), and another polymerizable monomer (a2) copolymerizable with these polymerizable monomers. The copolymer may be a random copolymer. Polymerizable monomers (a2) to (a4) may be used alone or in combination of two or more. Hydrolyzable resin (A3) can be obtained by, for example, copolymerizing polymerizable monomer(s) (a3) and/or (a4), and polymerizable monomer (a2) in the presence of a radical polymerization initiator. As to polymerizable monomers (a2) to (a4), the above description of hydrolyzable resin (A1) or (A2) is cited.

Polymerizable monomers (a2) to (a4) are preferably (meth)acrylic monomers.

The total content of the constituent units derived from polymerizable monomers (a3) and (a4) in hydrolyzable resin (A3) is preferably greater than or equal to 1 mass %, more preferably greater than or equal to 2 mass %, and still more preferably greater than or equal to 4 mass %, and may be greater than or equal to 6 mass %, based on 100 mass % of hydrolyzable resin (A3), from the viewpoint of enhancing the antifouling performance of the antifouling coating film. The content is preferably less than or equal to 30 mass %, more preferably less than or equal to 25 mass %, and still more preferably less than or equal to 20 mass %, based on 100 mass % of hydrolyzable resin (A3), from the viewpoint of achieving both a low consumption rate of a coating film and high antifouling performance. The rest is a constituent unit derived from polymerizable monomer (a2).

A weight average molecular weight (Mw) of hydrolyzable resin (A) is usually greater than or equal to 2,000 and less than or equal to 300,000, preferably greater than or equal to 5,000 and less than or equal to 100,000, and more preferably greater than or equal to 10,000 and less than or equal to 80,000. When the Mw is greater than or equal to 2,000, antifouling performance tends to be exhibited when a coating film is formed from an antifouling coating composition containing this. When the Mw is less than or equal to 300,000, hydrolyzable resin (A) tends to be easily and uniformly dispersed in the antifouling coating composition. In the present description, the Mw is a weight average molecular weight in terms of polystyrene measured by gel permeation chromatography (GPC).

From the viewpoint of achieving both a low consumption rate of a coating film and high antifouling performance, hydrolyzable resin (A) (when the antifouling coating composition contains two or more kinds of hydrolyzable resins (A), each of them) preferably has a glass transition temperature $Tg_A$ in the range of greater than or equal to 10° C. and less than or equal to 80° C., and a solubility parameter SPA in the range of greater than or equal to 8.5 and less than or equal to 9.7.

Glass transition temperature $Tg_A$ of hydrolyzable resin (A) is in the range of more preferably greater than or equal to 20° C. and less than or equal to 80° C., still more preferably greater than or equal to 30° C. and less than or equal to 80° C., yet still more preferably greater than or equal to 40° C. and less than or equal to 80° C., particularly preferably greater than or equal to 45° C. and less than or equal to 80° C., and most preferably greater than or equal to 45° C. and less than or equal to 78° C.

Solubility parameter $SP_A$ of hydrolyzable resin (A) is in the range of more preferably greater than or equal to 8.55 and less than or equal to 9.7, still more preferably greater than or equal to 8.60 and less than or equal to 9.65, yet still more preferably greater than or equal to 8.60 and less than or equal to 9.60, and particularly preferably greater than or equal to 8.70 and less than or equal to 9.50.

In the present description, the glass transition temperature is a temperature measured using a differential scanning calorimeter (DSC) in accordance with JIS K 7121.

The solubility parameter (SP) is a measure of solubility. A larger SP value indicates a higher polarity, while a smaller SP value indicates a lower polarity.

In the present description, the solubility parameter SP of a resin can be measured by the following method (Reference: SUH, CLARKE, J. P. S. A –1, 5, 1671 to 1681 (1967)).

At a measurement temperature of 20° C., 0.5 g of a resin is weighed in a 100 mL beaker, and 10 mL of a good solvent (acetone) is added using a whole pipette and dissolved with a magnetic stirrer to prepare a diluted solution. Next, a low-SP poor solvent (n-hexane) is gradually added dropwise to the diluted solution using a 50 mL burette, and the point at which turbidity occurs in the diluted solution is defined as a dropping amount of the low-SP poor solvent. Separately, a high-SP poor solvent (ion-exchanged water) is gradually added dropwise to the diluted solution, and the point at which turbidity occurs in the diluted solution is defined as a dropping amount of the high-SP poor solvent. The SP value can be calculated from the dropping amount of each of the poor solvents until the turbidity point is reached, by a publicly known calculation method described in the above reference and the like.

Glass transition temperature $Tg_A$ and solubility parameter $SP_A$ of hydrolyzable resin (A) can be controlled by adjusting the types and contents of the monomers forming hydrolyzable resin (A). $Tg_A$ can also be estimated or approximated from the glass transition temperatures of the monomers forming hydrolyzable resin (A). In addition, when the content of the monomer having a high polarity is increased, $SP_A$ tends to increase. When the content of the (meth)acrylic monomer represented by formula (4) is increased, $SP_A$ tends to decrease.

From the viewpoint of achieving both a low consumption rate of a coating film and high antifouling performance, the content of hydrolyzable resin (A) in the antifouling coating composition is preferably greater than or equal to 10 mass % and less than or equal to 90 mass %, more preferably greater than or equal to 20 mass % and less than or equal to 80 mass %, still more preferably greater than or equal to 30 mass % and less than or equal to 70 mass %, yet still more preferably greater than or equal to 40 mass % and less than or equal to 65 mass %, and particularly preferably greater than or equal to 45 mass % and less than or equal to 65 mass %, based on 100 mass % of the total amount of hydrolyzable resin (A), first non-hydrolyzable resin (B), and second non-hydrolyzable resin (C) contained in the antifouling coating composition.

[2] First Non-Hydrolyzable Resin (B) And Second Non-Hydrolyzable Resin (C)

The antifouling coating composition contains first non-hydrolyzable resin (B) and second non-hydrolyzable resin (C) in addition to hydrolyzable resin (A). The glass transition temperature of first non-hydrolyzable resin (B) is greater than the glass transition temperature of second non-hydrolyzable resin (C). The antifouling coating composition may contain two or more kinds of first non-hydrolyzable resins (B), and may contain two or more kinds of second non-hydrolyzable resins (C). The meaning of the "non-hydrolyzable resin" is as described above.

First non-hydrolyzable resin (B) and second non-hydrolyzable resin (C) are preferably (meth)acrylic resins.

When the glass transition temperature of first non-hydrolyzable resin (B) is $Tg_B$ [° C.], the solubility parameter thereof is $SP_B$, the glass transition temperature of second non-hydrolyzable resin (C) is $Tg_C$ [° C.], and the solubility parameter thereof is $SP_C$, first non-hydrolyzable resin (B) and second non-hydrolyzable resin (C) satisfy the following expressions [1] to [4]:

$$Tg_B - Tg_C \geq 60 \quad [1]$$

$$SP_B \geq 9.5 \quad [2]$$

$$SP_C \geq 9.5 \quad [3]$$

$$|SP_B - SP_C| \geq 1.0 \quad [4]$$

The antifouling coating composition according to the present invention, containing first non-hydrolyzable resin (B) and second non-hydrolyzable resin (C) satisfying the expressions [1] to [4] in addition to hydrolyzable resin (A), can form an antifouling coating film achieving both a low consumption rate of a coating film and high antifouling performance.

From the viewpoint of achieving both a low consumption rate of a coating film and high antifouling performance, the difference ($Tg_B - Tg_C$) between $Tg_B$ and $Tg_C$ is preferably greater than or equal to 70° C., more preferably greater than or equal to 80° C., and still more preferably greater than or equal to 90° C., and may be greater than or equal to 100° C. The difference is usually less than or equal to 150° C., and may be less than or equal to 140° C., less than or equal to 130° C., or less than or equal to 120° C.

From the viewpoint of achieving both a low consumption rate of a coating film and high antifouling performance, $Tg_B$ is preferably greater than or equal to 40° C. and less than or equal to 80° C., more preferably greater than or equal to 45° C. and less than or equal to 75° C., still more preferably greater than or equal to 50° C. and less than or equal to 70° C., and yet still more preferably greater than or equal to 50° C. and less than or equal to 65° C.

From the viewpoint of achieving both a low consumption rate of a coating film and high antifouling performance, $Tg_C$ is preferably greater than or equal to −50° C. and less than or equal to −20° C., more preferably greater than or equal to −50° C. and less than or equal to −25° C., still more preferably greater than or equal to −50° C. and less than or equal to −30° C., and yet still more preferably greater than or equal to −45° C. and less than or equal to −35° C.

Both $SP_B$ and $SP_C$ are greater than or equal to 9.5 (expressions [2] and [3]). The magnitude relationship between $SP_B$ and $SP_C$ is not particularly limited as long as expression [4] is satisfied. In one embodiment, $SP_C$ is greater than $SP_B$. In another embodiment, $SP_B$ is greater than $SP_C$. $|SP_B - SP_C|$ is preferably less than or equal to 0.8, more preferably less than or equal to 0.6, still more preferably less than or equal to 0.4, and yet still more preferably less than or equal to 0.3.

From the viewpoint of achieving both a low consumption rate of a coating film and high antifouling performance, $SP_B$ is preferably greater than or equal to 9.6 and less than or equal to 10.3, more preferably greater than or equal to 9.6 and less than or equal to 10.2, and still more preferably greater than or equal to 9.7 and less than or equal to 10.1.

From the viewpoint of achieving both a low consumption rate of a coating film and high antifouling performance, $SP_C$ is preferably greater than or equal to 9.8 and less than or equal to 10.6, more preferably greater than or equal to 9.8 and less than or equal to 10.5, and still more preferably greater than or equal to 9.9 and less than or equal to 10.4.

Similarly to $Tg_A$ and $SP_A$, $Tg_B$, $SP_B$, $Tg_C$, and $SP_C$ can be controlled by adjusting the types and contents of the monomers forming the resin. $Tg_B$ and $Tg_C$ can also be estimated or approximated from the glass transition temperatures of the monomers. In addition, when the contents of the monomers having a high polarity are increased, $SP_B$ and $SP_C$ tend to increase.

First non-hydrolyzable resin (B) is not particularly limited as long as it satisfies the expressions [1], [2], and [4]. Examples thereof include a (meth)acrylic resin formed from one kind or two or more kinds selected from the monomer group described above as the examples of polymerizable monomer (a2). Specific examples of first non-hydrolyzable resin (B) include: "DIANAL BR-106" manufactured by Mitsubishi Chemical Corporation; "ETERAC 7123-X-50" (BALBIS) manufactured by BALBIS Co., Ltd.;

"PARALOID B66" manufactured by The Dow Chemical Company; and "DEGALAN 64/12N" manufactured by Evonik Degussa Japan Co., Ltd., all of which are trade names.

Second non-hydrolyzable resin (C) is not particularly limited as long as it satisfies the expressions [1], [3], and [4]. Examples thereof include a (meth)acrylic resin formed from one kind or two or more kinds selected from the monomer group described above as the examples of polymerizable monomer (a2). Specific examples of second non-hydrolyzable resin (C) include "Lutonal A25" manufactured by BASF.

Second non-hydrolyzable resin (C) is not limited to the (meth)acrylic resin, and examples thereof also include polyvinyl alkyl ether.

The weight average molecular weights (Mw) of first non-hydrolyzable resin (B) and second non-hydrolyzable resin (C) are each usually greater than or equal to 2,000 and less than or equal to 300,000, preferably greater than or equal to 5,000 and less than or equal to 100,000, and more preferably greater than or equal to 10,000 and less than or equal to 80,000. Having an Mw of greater than or equal to 2,000 can be advantageous in achieving both a low consumption rate of a coating film and high antifouling performance. When the Mw is less than or equal to 300,000, these resins tend to be easily and uniformly dispersed in the antifouling coating composition.

From the viewpoint of achieving both a low consumption rate of a coating film and high antifouling performance, the content of first non-hydrolyzable resin (B) in the antifouling coating composition is preferably greater than or equal to 2 mass % and less than or equal to 50 mass %, more preferably greater than or equal to 3 mass % and less than or equal to 40 mass %, still more preferably greater than or equal to 5 mass % and less than or equal to 35 mass %, yet still more preferably greater than or equal to 5 mass % and less than or equal to 30 mass %, and particularly preferably greater than or equal to 5 mass % and less than or equal to 25 mass %, based on 100 mass % of the total amount of hydrolyzable resin (A), first non-hydrolyzable resin (B), and second non-hydrolyzable resin (C) contained in the antifouling coating composition.

From the viewpoint of achieving both a low consumption rate of a coating film and high antifouling performance, the content of second non-hydrolyzable resin (C) in the antifouling coating composition is preferably greater than or equal to 2 mass % and less than or equal to 50 mass %, more preferably greater than or equal to 5 mass % and less than or equal to 45 mass %, still more preferably greater than or equal to 10 mass % and less than or equal to 40 mass %, yet still more preferably greater than or equal to 15 mass % and less than or equal to 35 mass %, and particularly preferably greater than or equal to 20 mass % and less than or equal to 35 mass %, based on 100 mass % of the total amount of hydrolyzable resin (A), first non-hydrolyzable resin (B), and second non-hydrolyzable resin (C) contained in the antifouling coating composition.

From the viewpoint of achieving both a low consumption rate of a coating film and high antifouling performance, the content ratio ((B)/(A)) of first non-hydrolyzable resin (B) to hydrolyzable resin (A) in the antifouling coating composition is preferably greater than or equal to 0.02 and less than or equal to 1, more preferably greater than or equal to 0.05 and less than or equal to 0.8, still more preferably greater than or equal to 0.1 and less than or equal to 0.6, and yet still more preferably greater than or equal to 0.1 and less than or equal to 0.5 in terms of mass ratio.

From the viewpoint of achieving both a low consumption rate of a coating film and high antifouling performance, the content ratio ((C)/(A)) of second non-hydrolyzable resin (C) to hydrolyzable resin (A) in the antifouling coating composition is preferably greater than or equal to 0.01 and less than or equal to 1, more preferably greater than or equal to 0.02 and less than or equal to 0.9, still more preferably greater than or equal to 0.05 and less than or equal to 0.8, and yet still more preferably greater than or equal to 0.05 and less than or equal to 0.65, and may be greater than or equal to 0.1, greater than or equal to 0.2, or greater than or equal to 0.3, and may be less than or equal to 0.6 in terms of mass ratio.

From the viewpoint of achieving both a low consumption rate of a coating film and high antifouling performance, the content ratio ((B)/(C)) of first non-hydrolyzable resin (B) to second non-hydrolyzable resin (C) in antifouling coating composition is preferably greater than or equal to 0.05 and less than or equal to 9, more preferably greater than or equal to 0.1 and less than or equal to 6, still more preferably greater than or equal to 0.2 and less than or equal to 2, yet still more preferably greater than or equal to 0.2 and less than or equal to 1.5, and particularly preferably greater than or equal to 0.2 and less than or equal to 1 in terms of mass ratio.

From the viewpoint of achieving both a low consumption rate of a coating film and high antifouling performance, the total amount of hydrolyzable resin (A), first non-hydrolyzable resin (B), and second non-hydrolyzable resin (C) contained in the antifouling coating composition is preferably greater than or equal to 5 mass % and less than or equal to 40 mass %, and more preferably greater than or equal to 10 mass % and less than or equal to 20 mass %, based on 100 mass % of the solid content contained in the antifouling coating composition.

The solid content contained in the antifouling coating composition refers to the total of components other than the solvent contained in the antifouling coating composition.

[3] Antifouling Agent (D)

The antifouling coating composition contains one or more antifouling agents (D). Antifouling agent (D) is not particularly limited, and publicly known antifouling agents can be used. Examples thereof include antifouling agents such as inorganic compounds, metal-containing organic compounds, and metal-free organic compounds.

Examples of antifouling agent (D) include cuprous oxide; manganese ethylene-bis-dithiocarbamate; zinc dimethyldithiocarbamate; 2-methylthio-4-t-butylamino-6-cyclopropylamino-s-triazine; 2,4,5,6-tetrachloroisophthalonitrile; N,N-dimethyl dichlorophenyl urea; zinc ethylene-bis-dithiocarbamate; copper rhodanide (copper(I) thiocyanate); 4,5-dichloro-2-n-octyl-4-isothiazolin-3-one (4,5-dichloro-2-n-octyl-3(2H) isothiazolone); N-(fluorodichloromethylthio) phthalimide; N,N'-dimethyl-N'-phenyl-(N-fluorodichloromethylthio) sulfamide; 2-pyridinethiol-1-oxide zinc salt (zinc pyrithione); 2-pyridinethiol-1-oxide copper salt (copper pyrithione); tetramethylthiuram disulfide; 2,4,6-trichlorophenylmaleimide; 2,3,5,6-tetrachloro-4-(methylsulfonyl) pyridine; 3-iodo-2-propylbutylcarbamate; diiodomethyl-para-trisulfone; phenyl(bispyridyl)bismuth dichloride; 2-(4-thiazolyl)-benzimidazole; triphenylboron pyridine salt; stearylamine-triphenylboron; laurylamine-triphenylboron; bisdimethyl dithiocarbamoyl zinc ethylene bisdithiocarbamate; 1,1-dichloro-N-[(dimethylamino)sulfonyl]-1-fluoro-N-phenylmethanesulfenamide; 1,1-dichloro-N-[(dimethylamino)sulfonyl]-1-fluoro-N-(4-methylphenyl) methanesulfenamide; N'-(3,4-dichlorophenyl)-N, N'-dimethylurea; N'-tert-butyl-N-cyclopropyl-6-(methylthio)-1, 3,5-triazine-2,4-diamine; 4-bromo-2-(4-chlorophenyl)-5-(trifluoromethyl)-1H-pyrrole-3-carbonitrile; and medetomidine.

The content of antifouling agent (D) in the antifouling coating composition is usually greater than or equal to 0.3 parts by mass and less than or equal to 550 parts by mass, preferably greater than or equal to 1 part by mass and less than or equal to 500 parts by mass, more preferably greater than or equal to 5 parts by mass and less than or equal to 300 parts by mass, still more preferably greater than or equal to 5 parts by mass and less than or equal to 200 parts by mass, and yet still more preferably greater than or equal to 10 parts by mass and less than or equal to 150 parts by mass, based on 100 parts by mass of hydrolyzable resin (A).

If the content of antifouling agent (D) is excessively small, the coating film tends not to exhibit antifouling performance. If the content of the antifouling agent is excessively large, the coating film may cause defects such as cracks and peeling.

[4] Rosin Compound (E)

The antifouling coating composition may contain a rosin compound (E). Since rosin compound (E) is not a resin (a polymer that is a polymerization product of a monomer), it does not belong to hydrolyzable resin (A), first non-hydrolyzable resin (B), and second non-hydrolyzable resin (C). When the antifouling coating composition contains rosin compound (E), the antifouling performance of the coating film tends to be enhanced.

Rosin compound (E) refers to a rosin or a rosin derivative. Examples of the rosin derivative include hydrogenated rosin, disproportionated rosin, maleated rosin, formylated rosin, and polymerized rosin.

When the antifouling coating composition contains rosin compound (E), the content of rosin compound (E) is preferably greater than or equal to 1 part by mass and less than or equal to 50 parts by mass, more preferably greater than or equal to 2 parts by mass and less than or equal to 40 parts by mass, and still more preferably greater than or equal to 5 parts by mass and less than or equal to 35 parts by mass, based on 100 parts by mass of the total amount of hydrolyzable resin (A), first non-hydrolyzable resin (B), and second non-hydrolyzable resin (C) contained in the antifouling coating composition.

[5] Other Components

The antifouling coating composition may contain other components other than those described above. Examples of the other components include a coating film consumption adjusting agent, a pigment, a plasticizer, a solvent, a water binder, an anti-sagging agent, a color separation inhibitor, an anti-settling agent, an antifoaming agent, an ultraviolet absorber, a surface adjusting agent, a viscosity modifier, a leveling agent, and a dispersant (e.g., colloidal silica).

Examples of the pigment include: extender pigments, such as precipitated barium, talc, clay, chalk, silica white, alumina white, bentonite, calcium carbonate, magnesium carbonate, silicic acid, silicic acid salts, aluminum oxide hydrate, and calcium sulfate; and color pigments, such as titanium oxide, zirconium oxide, basic lead sulfate, tin oxide, carbon black, white lead, graphite, zinc sulfide, zinc oxide (flowers of zinc), chrome oxide, yellow nickel titanium, yellow chromium titanium, yellow iron oxide, red iron oxide, black iron oxide, azo-based red and yellow pigments, chrome yellow, phthalocyanine green, phthalocyanine blue, ultramarine blue, and quinacridone.

The pigments may be used alone or in combination of two or more.

Examples of the plasticizer include: phthalic acid ester plasticizers, such as dioctyl phthalate (DOP), dimethyl phthalate, dicyclohexyl phthalate, and diisodecyl phthalate (DIDP); aliphatic dibasic acid ester plasticizers, such as isobutyl adipate and dibutyl sebacate; glycol ester plasticizers, such as diethylene glycol dibenzoate and pentaerythritol alkyl ester; phosphoric acid ester plasticizers, such as tricresyl phosphoric acid (tricresyl phosphate), triaryl phosphoric acid (triaryl phosphate), and trichloroethyl phosphoric acid; epoxy plasticizers, such as epoxy soybean oil and octyl epoxystearate; organic tin plasticizers, such as dioctyltin laurate and dibutyltin laurate; trioctyl trimellitate, and triacetylene.

The plasticizer may be used alone or in combination of two or more.

Examples of the solvent include: hydrocarbons, such as toluene, xylene, ethylbenzene, cyclopentane, octane, heptane, cyclohexane, and white spirit; ethers, such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; esters, such as butyl acetate, propyl acetate, benzyl acetate, ethylene glycol monomethyl ether acetate, and ethylene glycol monoethyl ether acetate; ketones, such as ethyl isobutyl ketone and methyl isobutyl ketone; and alcohols, such as n-butanol and propyl alcohol.

The solvent may be used alone or in combination of two or more.

Method For Producing Antifouling Coating Composition

The antifouling coating composition can be prepared by mixing predetermined components and other components to be added as necessary using a mixer, such as a ball mill, a pebble mill, a roll mill, a sand grind mill, or a disper. For example, hydrolyzable resin (A), first non-hydrolyzable resin (B), and second non-hydrolyzable resin (C) may be mixed in a solution state.

Coating Film

The coating film according to the present invention is an antifouling coating film formed from the antifouling coating composition according to the present invention. The antifouling coating film according to the present invention can achieve both a low consumption rate (long-term antifouling property) of a coating film and high antifouling performance.

The antifouling coating film can be formed by applying the antifouling coating composition to the surface of a target object in accordance with an ordinary method and then removing the solvent by volatilization at ordinary temperature or with heating as needed.

The thickness of the antifouling coating film is, for example, greater than or equal to 50 μm and less than or equal to 500 μm, and preferably greater than or equal to 100 μm and less than or equal to 400 μm.

The method for applying the antifouling coating composition is not particularly limited, and examples thereof include methods such as an immersion method, a spray method, brush coating, roller, electrostatic coating, and electrodeposition coating.

The target object is not particularly limited, and examples thereof include ships; various fishing nets including those for aquaculture, and other fishing gears; port facilities; booms; water intake facilities, such as power plants; piping, such as cooling water conduits; bridges; buoys; industrial water facilities; and underwater structures, such as submarine bases. The target object is preferably a ship or an underwater structure.

The application surface of the target object may be pretreated as needed, or may have a composite coating film including an undercoat formed from other paint such as an anti-corrosive paint (corrosion resistant paint) on the target object and an antifouling coating film formed of the antifouling coating composition of the present invention on the undercoat.

EXAMPLES

The present invention will be described below in more detail by way of examples and comparative examples, but the present invention is not limited thereto.

Production Examples A1 to A10: Preparation Of Hydrolyzable Resins A1 To A10

To a four-necked flask equipped with a thermometer, a condenser, a stirrer, a dropping funnel, a nitrogen inlet tube, and a temperature controller, 34 g of xylene was added as a solvent and maintained at 95 ±3° C. A mixture containing the monomers shown in Table 1 in the amounts shown in Table 1 (the blending amounts of the monomers shown in Table 1 are expressed in "g") and 1.0 g of tert-butyl peroxy-2-ethylhexanoate, which was a radical polymerization initiator, was placed in the dropping funnel and added dropwise to the four-necked flask over four hours. The mixture was then incubated for four hours, and 33 g of xylene was added to the mixture. The resulting mixture was cooled to obtain a solution containing a hydrolyzable resin. Hereinafter, the solutions containing hydrolyzable resins A1 to A10 (they are each also referred to as resins A1 to A10) are each also referred to as "resin solutions A1 to A10."

Glass transition temperature $Tg_A$, solubility parameter $SP_A$, and weight average molecular weight Mw of each of resins A1 to A10 obtained, and the solid content of each of resin solutions A1 to A10 were measured. The results are shown in Table 1. The measurement methods are as described below.

(i) Glass Transition Temperature

Glass transition temperature Tg was measured using a differential scanning calorimeter (DSC) in accordance with JIS K 7121. As the differential scanning calorimeter (DSC), "X-DSC7000" manufactured by SII Nanotechnology Inc. was used.

(ii) Solubility Parameter

Solubility parameter was determined by the method described above.

(iii) Weight Average Molecular Weight Mw

Weight average molecular weight Mw of the resin is a weight average molecular weight in terms of polystyrene measured by GPC. Measurement conditions were set as described below.
Apparatus: "HLC-8220GPC" manufactured by Tosoh Corporation
Column: TSKgel SuperHZM-M×2 columns
Eluent: tetrahydrofuran
Measurement temperature: 35° C.
Detector: RI (iv) Solid Content The solid content was calculated according to the following expression.
Solid content (mass %)=100 ×(total mass of raw materials used for preparation of resin solution excluding solvent)/ (mass of resin solution obtained)

TABLE 1

| | | Production Examples | | | | | | | | | |
|---|---|---|---|---|---|---|---|---|---|---|---|
| | | A1 | A2 | A3 | A4 | A5 | A6 | A7 | A8 | A9 | A10 |
| | | Hydrolyzable resin No. | | | | | | | | | |
| | | A1 | A2 | A3 | A4 | A5 | A6 | A7 | A8 | A9 | A10 |
| Monomer | (1) TIPSMA | | 30.0 | 50.0 | | 20.0 | 20.0 | | 5.0 | 60.0 | 30.0 | |
| | (2) TIPSA | 30.0 | | | 69.0 | | | 69.0 | | | 20.0 | 50.0 |
| | (3) MEA | | | | 5.0 | | | | | | | |
| | (4) MEMA | | | | | | | | | 15.0 | 10.0 | |
| | (5) M-90G | | | | | | | | | | | |
| | (6) MMA | 25.8 | 66.4 | 25.0 | | 76.9 | 13.4 | | 20.0 | 35.0 | 50.0 | |
| | (7) EA | 33.9 | | | 17.0 | 3.1 | 66.6 | 17.0 | | | | |
| | (8) n-BA | 10.3 | 3.6 | | | | | | 5.0 | 5.0 | | |
| | (9) EHA | | | | | | | | | | | |
| | (10) n-BMA | | | | | | | | | | | |
| | (11) i-BMA | | | | | 9.0 | | | 9.0 | | | |
| | (12) t-BMA | | | 25.0 | | | | | | | | |
| | Total | 100.0 | 100.0 | 100.0 | 100.0 | 100.0 | 100.0 | 100.0 | 100.0 | 100.0 | 100.0 |
| Glass transition temperature $Tg_A$ (° C.) | | 10 | 75 | 71 | 10 | 85 | 0 | 16 | 38 | 44 | 58 |
| Solubility parameter $SP_A$ | | 9.7 | 9.7 | 8.8 | 8.7 | 10.1 | 9.9 | 8.1 | 8.8 | 9.1 | 9.1 |
| Weight average molecular weight Mw (×10$^4$) | | 4.2 | 4.3 | 4.3 | 4.1 | 4.7 | 4.5 | 4.0 | 4.4 | 4.3 | 4.2 |
| Solid Content (mass %) | | 58.0 | 53.0 | 59.0 | 60.0 | 50.0 | 60.0 | 60.0 | 58.0 | 55.0 | 55.0 |

Production Examples B1 To B7: Preparation Of First Non-Hydrolyzable Resins B1 to B7

To a four-necked flask equipped with a thermometer, a condenser, a stirrer, a dropping funnel, a nitrogen inlet tube, and a temperature controller, 34 g of xylene was added as a solvent and maintained at 95±3° C. A mixture containing the monomers shown in Table 2 in the amounts shown in Table 2 (the blending amounts of the monomers shown in Table 2 are expressed in "g") and 1.0 g of tert-butyl peroxy-2-ethylhexanoate, which was a radical polymerization initiator, was placed in the dropping funnel and added dropwise to the four-necked flask over four hours. The mixture was then incubated for four hours, and 66 g of xylene was added to the mixture. The resulting mixture was cooled to obtain a solution containing a non-hydrolyzable resin. Hereinafter, the solutions containing non-hydrolyzable resins B1 to B7 (they are each also referred to as resins B1 to B7) are each also referred to as "resin solutions B1 to B7."

Glass transition temperature $Tg_B$, solubility parameter $SP_B$, and weight average molecular weight Mw of each of non-hydrolyzable resins B1 to B7 obtained, and the solid content of each of resin solutions B1 to B7 were measured. The results are shown in Table 2. The measurement methods are the same as in the above (i) to (iv).

Preparation Of First Non-Hydrolyzable Resins B8 To B10

Commercially available (meth)acrylic resins were prepared as first non-hydrolyzable resins B8 to B10 (they are each also referred to as resins B8 to B10). Glass transition temperature $Tg_B$, solubility parameter $SP_B$, and weight average molecular weight Mw of each of non-hydrolyzable resins B8 to B10 were measured. The results are shown in Table 2. The measurement methods are the same as in the above (i) to (iii). The solid contents (nominal values) of non-hydrolyzable resins B8 to B10 are shown in Table 2.

Production Examples C1 to C8: Preparation Of Second Non-Hydrolyzable Resins C1 to C8

To a four-necked flask equipped with a thermometer, a condenser, a stirrer, a dropping funnel, a nitrogen inlet tube, and a temperature controller, 34 g of xylene was added as a solvent and maintained at 95±3° C. A mixture containing the monomers shown in Table 3 in the amounts shown in Table 3 (the blending amounts of the monomers shown in Table 3 are expressed in "g") and 1.0 g of tert-butyl peroxy-2-ethylhexanoate, which was a radical polymerization initiator, was placed in the dropping funnel and added dropwise to the four-necked flask over four hours. The mixture was then incubated for four hours, and 33 g of xylene was added to the mixture. The resulting mixture was cooled to obtain a solution containing a non-hydrolyzable resin. Hereinafter, the solutions containing non-hydrolyzable resins C1 to C8 (they are each also referred to as resins C1 to C8) are each also referred to as "resin solutions C1 to C8."

Glass transition temperature $Tg_C$, solubility parameter $SP_C$, and weight average molecular weight Mw of each of non-hydrolyzable resins C1 to C8 obtained, and the solid content of each of resin solutions C1 to C8 were measured. The results are shown in Table 3. The measurement methods are the same as in the above (i) to (iv).

Preparation Of Second Non-Hydrolyzable Resins C9 And C10

A commercially available resin was prepared as a second non-hydrolyzable resin C9 (also referred to as a resin C9). In addition, a commercially available resin was prepared as a second non-hydrolyzable resin C10 (also referred to as a resin C10). Glass transition temperature $Tg_C$ and solubility parameter $SP_C$ of each of non-hydrolyzable resins C9 and C10 were measured. The results are shown in Table 3. The measurement methods are the same as in the above (i) and (ii). The solid contents (nominal values) of non-hydrolyzable resins C9 and C10 are shown in Table 3.

TABLE 2

| | | Production Examples | | | | | | | Commercially available products | | |
|---|---|---|---|---|---|---|---|---|---|---|---|
| | | B1 | B2 | B3 | B4 | B5 | B6 | B7 | | | |
| | | Non-hydrolyzable resin No. | | | | | | | | | |
| | | B1 | B2 | B3 | B4 | B5 | B6 | B7 | B8 | B9 | B10 |
| Monomer | (1) TIPSMA | | | | | | | | | | |
| | (2) TIPSA | | | | | | | | | | |
| | (3) MEA | | | | | 2.0 | | 14.0 | | | |
| | (4) MEMA | | | | | | | | | | |
| | (5) M-90G | | | | | | | | | | |
| | (6) MMA | 12.5 | 67.0 | 27.9 | 47.0 | 78.0 | 47.0 | | | | |
| | (7) EA | 15.4 | | | 26.0 | | 26.0 | 10.4 | | | |
| | (8) n-BA | | 2.2 | | 2.2 | 1.2 | 2.2 | 17.5 | | | |
| | (9) EHA | | | | | | | | | | |
| | (10) n-BMA | | | | | | | | | | |
| | (11) i-BMA | 72.1 | 30.8 | 57.1 | 22.8 | 20.8 | 10.8 | 72.1 | | | |
| | (12) t-BMA | | | 15.0 | | | | | | | |
| | Total | 100.0 | 100.0 | 100.0 | 100.0 | 100.0 | 100.0 | 100.0 | | | |
| Glass transition temperature $Tg_B$ (° C.) | | 40 | 80 | 70 | 41 | 88 | 25 | 16 | 60 | 51 | 50 |
| Solubility parameter $SP_B$ | | 9.6 | 10.2 | 9.7 | 10.3 | 10.4 | 10.5 | 9.4 | 10.0 | 9.7 | 10.0 |
| Weight average molecular weight Mw (×10⁴) | | 4.6 | 5.5 | 4.8 | 5.4 | 5.5 | 5.4 | 4.5 | 6.5 | 6.4 | 6.5 |
| Solid Content (mass %) | | 55.0 | 49.0 | 53.0 | 50.0 | 51.0 | 51.0 | 50.0 | 100.0 | 50.0 | 100.0 |

TABLE 3

| | | Production Examples | | | | | | | | Commercially available products | |
|---|---|---|---|---|---|---|---|---|---|---|---|
| | | C1 | C2 | C3 | C4 | C5 | C6 | C7 | C8 | | |
| | | Non-hydrolyzable resin No. | | | | | | | | | |
| | | C1 | C2 | C3 | C4 | C5 | C6 | C7 | C8 | C9 | C10 |
| Monomer | (1) TIPSMA | | | | | | | | | | |
| | (2) TIPSA | | | | | | | | | | |
| | (3) MEA | | 40.0 | | 5.0 | 20.0 | | | | | |
| | (4) MEMA | | | | | | | | | | |
| | (5) M-90G | | | 17.0 | | | 20.0 | | | | |
| | (6) MMA | 12.8 | 18.3 | 5.0 | | 17.1 | | | | | |
| | (7) EA | 17.2 | 41.7 | 8.4 | 25.0 | 63.0 | 8.4 | 25.0 | 66.2 | | |
| | (8) n-BA | 47.8 | | 69.6 | 70.0 | | 71.6 | 45.0 | 33.8 | | |
| | (9) EHA | | | | | | | 30.0 | | | |
| | (10) n-BMA | 19.9 | | | | | | | | | |
| | (11) i-BMA | | | | | | | | | | |
| | (12) t-BMA | 2.3 | | | | | | | | | |
| Total | | 100.0 | 100.0 | 100.0 | 100.0 | 100.0 | 100.0 | 100.0 | 100.0 | | |
| Glass transition temperature $Tg_C$ (°C) | | −20 | −20 | −50 | −47 | −15 | −55 | −53 | −35 | −42 | −25 |
| Solubility parameter $SP_C$ | | 9.8 | 10.6 | 10.4 | 9.8 | 10.6 | 10.5 | 9.4 | 10.2 | 10.0 | 9.0 |
| Weight average molecular weight Mw (×$10^4$) | | 4.1 | 4.2 | 4.0 | 4.1 | 4.0 | 3.8 | 3.7 | 3.9 | | |
| Solid Content (mass %) | | 62.0 | 60.0 | 60.0 | 60.0 | 62.0 | 64.0 | 64.0 | 60.0 | 95.0 | 100.0 |

The details of the abbreviations shown in Tables 1 to 3 are as described below.
(1) TIPSMA: Triisopropylsilyl methacrylate
(2) TIPSA: Triisopropylsilyl acrylate
(3) MEA: 2-Methoxyethyl acrylate
(4) MEMA: 2-Methoxyethyl methacrylate
(5) M-90G: Methoxy polyethylene glycol methacrylate (the number of repetitions of oxyethylene chain=9)
(6) MMA: Methyl methacrylate
(7) EA: Ethyl acrylate
(8) n-BA: n-Butyl acrylate
(9) EHA: 2-Ethylhexyl acrylate
(10) n-BMA: n-Butyl methacrylate
(11) i-BMA: Isobutyl methacrylate
(12) t-BMA: tert-Butyl methacrylate
(13) Non-hydrolyzable resin B8: (Meth)acrylic resin ("DIANAL BR -106" manufactured by Mitsubishi Chemical Corporation, solid content: 100 mass %)
(14) Non-hydrolyzable resin B9: (Meth)acrylic resin ("ETERAC 7123-X −50" manufactured by BALBIS Co., Ltd., a solution containing xylene as a solvent and having a solid content of 50.0 mass %)
(15) Non-hydrolyzable resin B10: (Meth)acrylic resin ("PARALOID B-66" manufactured by The Dow Chemical Company, solid content: 100 mass %)
(16) Non-hydrolyzable resin C9: Polyvinyl ethyl ether ("Lutonal A25" manufactured by BASF, solid content: 95.0 mass %)
(17) Non-hydrolyzable resin C10: Chlorinated paraffin: (Toyoparax A50 manufactured by Tosoh Corporation, solid content: 100 mass %)

Examples 1 To 38, Comparative Examples 1 to 8

[a] Preparation Of Antifouling Coating Composition

According to the formulations (parts by mass) in Tables 4 to 10, the components shown in the same tables were mixed and dispersed using a disper (2000 rpm) to prepare antifouling coating compositions. For hydrolyzable resin (A) and non-hydrolyzable reason resins (B) and (C), the resin solutions prepared above were blended. When commercially available products were to be used, they were blended as they were.

The details of the components shown in Tables 4 to 10 are as described below.
(1) Antifouling agent D1: Cuprous oxide (manufactured by FURUKAWA CHEMICALS Co., Ltd.)
(2) Antifouling agent D2: Copper pyrithione ("Copper Omadine" manufactured by Arch Chemicals Inc.)
(3) Antifouling agent D3: Medetomidine ("Selektope" manufactured by I-TECH AB)
(4) Antifouling agent D4: 4,5-Dichloro-2-n-octyl-4-isothiazoline-3-one (4,5-dichloro-2-n-octyl-3 (2H)-isothiazolone) ("SeaNine 211" manufactured by Rohm and Haas)
(5) Rosin compound (E): Gum rosin: ("WW Rosin" manufactured by Arakawa Chemical Industries, Ltd.)
(6) Other component F1: Xylene
(7) Other component F2: Titanium oxide pigment ("TI-PURER-900" manufactured by Du Pont)
(8) Other component F3: Iron oxide red pigment ("Bayferox 130" manufactured by LANXESS)
(9) Other component F4: Silica pigment ("S-SIL20" manufactured by SAC Corporation)
(10) Other component F5: Anti-sagging agent ("Disparlon A 6900-20X" manufactured by Kusumoto Chemicals, Ltd.)
In Tables 4 to 10, "(B)/(A)" represents the content ratio (mass ratio) of non-hydrolyzable resin (B) to hydrolyzable resin (A). "(C)/(A)" represents the content ratio (mass ratio) of non-hydrolyzable resin (C) to hydrolyzable resin (A).

[b] Evaluation Of Consumption Rate Of A Coating Film

The obtained antifouling coating composition was applied to a blasted plate previously coated with an anti-corrosive paint such that the dry coating thickness was 300 μm. The plate was left to stand in a room for two days and two nights for drying to obtain a test plate having an antifouling coating film. This test plate was attached to a side surface of a cylinder having a diameter of 750 mm and a length of 1200 mm, and continuously rotated in seawater at a circumferential speed of 15 knots for days and nights to perform a coating film consumption test of measuring changes over time in consumption amount (cumulative decrement [μm] in coating film thickness) of the coating film of the test plate. The results are shown in Tables 4 to 10.

[c] Evaluation Of Antifouling Property (Dynamic Antifouling Property) Of Coating Film The obtained antifouling coating composition was applied to a blasted plate previously coated with an anti-corrosive paint such that the dry coating thickness was 300 μm. The plate was left to stand in a room for two days and two nights for drying to obtain a test plate having an antifouling coating film.

Figure 2:
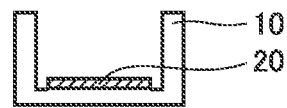
FIG. 2 is a schematic cross-sectional view illustrating a method for evaluating a dynamic antifouling property of a coating film.

A water passage 10 made of metal shown in FIGS. 1 and 2 was prepared. Water passage 10 has a groove having a width of 450 mm and a depth of 200 mm. As shown in the figures, a test plate 20 produced above was placed on the bottom surface of the groove with the antifouling coating film facing up.

Water passage 10 on which test plate 20 was placed was placed indoors exposed to sunlight in the Marine Seafront Research Center of NIPPON PAINT MARINE COATINGS Co., Ltd. in Tamano, Okayama. Water passage 10 was arranged along the north-south direction in order to maximize the time when sunlight strikes test plate 20 (FIG. 1). Natural seawater continuously drawn up from the Seto Inland Sea was continuously flowed into water passage 10. A flow direction 30 of the natural seawater was from the north to the south. The water level of the natural seawater flowing in water passage 10 was changed from 40 mm to 200 mm every 12 hours to simulate the natural tide levels. The flow velocity of the natural seawater flowing in water passage 10 was set to, in accordance with the water level, from about 30 cm/sec (when the water level was lowest) to about 10 cm/sec (when the water level was highest).

A test of continuously flowing the natural seawater into water passage 10 was performed for 12 months, and the attachment area of marine organisms was determined and evaluated according to the following criteria. The evaluation results at 6 months and 12 months in the test are shown in Table 4 to 10. The evaluation result is preferably greater than or equal to 3.

5: The attachment area of marine organisms is greater than or equal to 0% and less than 5%.
4: The attachment area of marine organisms is greater than or equal to 5% and less than 10%.
3: The attachment area of marine organisms is greater than or equal to 10% and less than 15%.
2: The attachment area of marine organisms is greater than or equal to 15% and less than 30%.
1: The attachment area of marine organisms is greater than or equal to 30%.

[d] Evaluation Of Storage Stability Of Antifouling Coating Composition

In a container, 200 mL of the antifouling coating composition was placed and stored at 40° C. for 6 months, and then the stirring property was evaluated according to the following criteria. The evaluation results are shown in Tables 4 to 10. The evaluation result is preferably greater than or equal to C.

A: The composition can be easily stirred.
B: The composition can be stirred.
C: The composition can be stirred with slight force.
D: The composition is hard to stir.
E: The composition cannot be stirred.

[e] Evaluation Of Dry-Wet Alternating Adhesiveness Of Coating Film

The obtained antifouling coating composition was applied to a blasted plate previously coated with an anti-corrosive paint such that the dry coating thickness was 300 μm. The plate was left to stand in a room for two days and two nights for drying to obtain a test plate having an antifouling coating film. The obtained test plate was fixed to a raft installed in Aioi Bay, Ako City, Hyogo Prefecture. The test plate was fixed at about 15 cm above the sea using the frame of the raft. By fixing the test plate at about 15 cm above the sea, the antifouling coating film is repeatedly brought into contact and non-contact with seawater by waves.

For the test plates after 6 months from the fixation to the raft, a cross-cut adhesion test was conducted according to JIS K 5600.5.6 (clearance interval: 2 mm, number of squares: 25). The results are shown in Tables 4 to 10. The numerical values in Tables 4 and 10 represent scores of the test results in accordance with the following criteria. The evaluation score is preferably greater than or equal to 6.

Score 10: Each scratch is thin and smooth in both sides, and no peeling is observed at an intersection of scratch and in each square.
Score 8: Slight peeling is observed at an intersection of scratch, no peeling is observed in each square, and the area of defected parts is less than or equal to 5% of the entire square area.
Score 6: Peeling is observed on both sides and at an intersection of scratch, and the area of defected parts is 5 to 15% of the entire square area.
Score 4: The width of peeling due to scratch is large, and the area of defect parts is greater than or equal to 15% and less than or equal to 35% of the entire square area.
Score 2: The width of peeling due to scratch is larger than that of score 4, and the area of defected parts is greater than or equal to 35% and less than or equal to 65% of the entire square area.
Score 0: The area of peeling is greater than or equal to 65% of the entire square area.

[f] Evaluation Of Drying Property Of A Coating Film

The obtained antifouling coating composition was applied to a blasted plate (size: 150×70×3.2 mm) previously coated with an anti-corrosive paint with airless spray such that the dry coating thickness was 160 μm, and the plate was dried at 23° C. for 1 day to form a coating film. The above operation was repeated 2 times to produce a test plate having an antifouling coating film with a dry thickness of 320 μm. The obtained test plate was dried at 23° C. for another 7 days.

A piece of wood of 30×30×10 mm was placed on the antifouling coating film (central part) of the test plate after drying, and a pressure of 40 kgf/cm2 (3.9 MPa) was applied in a vertical direction (coating film direction) from above the piece of wood for 20 minutes. The piece of wood was removed, and the state (degree of deformation) of the coating film surface was visually evaluated according to the following criteria. The evaluation results are shown in Tables 4 to 10. FIG. 3 is cross-sectional views each schematically showing a coating film state corresponding to each evaluation criterion. The evaluation result is preferably greater than or equal to 3.

5: A slight trace of the piece of wood is observed.
4: A slight deformation is observed around the location where the piece of wood was placed.
3: A raised portion is observed around the location where the piece of wood was placed.
2: A large raised portion is observed around the location where the piece of wood was placed.
1: A raised portion around the location where the piece of wood was placed is large, and its protrusion to the outside is remarkable.

TABLE 4

|  |  | Examples | | | | | | | |
| --- | --- | --- | --- | --- | --- | --- | --- | --- | --- |
|  |  | 1 | 2 | 3 | 4 | 5 | 6 | 7 | 8 |
| Hydrolyzable resin (A) |  | A3 | A2 | A1 | A4 | A10 | A5 | A6 | A7 |
|  |  | 12.47 | 14.03 | 12.62 | 12.63 | 13.99 | 14.75 | 12.60 | 12.63 |
| Non-hydrolyzable resin (B) |  | B10 | B9 | B9 | B8 | B8 | B9 | B9 | B8 |
|  |  | 2.43 | 5.67 | 5.58 | 2.41 | 2.44 | 5.62 | 5.76 | 2.41 |
| Non-hydrolyzable resin (C) |  | C2 | C9 | C9 | C8 | C9 | C9 | C9 | C8 |
|  |  | 6.40 | 3.90 | 3.85 | 5.79 | 3.73 | 3.87 | 3.96 | 5.82 |
| Antifouling | D1 | 43.07 | 41.81 | 41.16 | 42.61 | 43.25 | 41.46 | 42.50 | 42.61 |
| agent (D) | D2 | 4.76 | 4.62 | 4.55 | 4.71 | 4.78 | 4.58 | 4.70 | 4.71 |
|  | D3 |  |  |  |  |  |  |  |  |
|  | D4 | 0.67 |  |  |  |  |  |  |  |
| Rosin compound (E) |  | 1.59 | 0.77 | 0.76 | 1.57 | 1.60 | 0.77 | 0.79 | 1.57 |
| Other | F1 | 13.92 | 13.03 | 15.57 | 13.81 | 13.48 | 12.92 | 13.25 | 13.78 |
| components | F2 | 0.44 | 0.49 | 0.48 | 0.50 | 0.50 | 0.48 | 0.50 | 0.50 |
|  | F3 | 4.84 | 5.32 | 5.24 | 5.42 | 5.51 | 5.28 | 5.41 | 5.42 |
|  | F4 | 8.18 | 9.00 | 8.86 | 9.17 | 9.31 | 8.93 | 9.15 | 9.17 |
|  | F5 | 1.23 | 1.36 | 1.34 | 1.38 | 1.40 | 1.35 | 1.38 | 1.38 |
| Total |  | 100.00 | 100.00 | 100.00 | 100.00 | 100.00 | 100.00 | 100.00 | 100.00 |
| (B)/(A) |  | 0.33 | 0.38 | 0.38 | 0.32 | 0.32 | 0.38 | 0.38 | 0.32 |
| (C)/(A) |  | 0.52 | 0.50 | 0.50 | 0.46 | 0.46 | 0.50 | 0.50 | 0.46 |
| Coating film | After 3 months | 10 | 13 | 11 | 12 | 15 | 9 | 18 | 5 |
| consumption | After 6 months | 21 | 25 | 21 | 19 | 29 | 19 | 37 | 13 |
| amount | After 12 months | 42 | 45 | 39 | 34 | 55 | 45 | 66 | 30 |
| (μm) | After 18 months | 66 | 69 | 57 | 54 | 75 | 76 | 85 | 49 |
|  | After 24 months | 93 | 95 | 83 | 80 | 91 | 110 | 100 | 75 |
| Antifouling | 6 months | 5 | 5 | 5 | 5 | 5 | 5 | 5 | 4 |
| property | 12 months | 5 | 4 | 5 | 5 | 5 | 5 | 5 | 3 |
| Storage stability |  | A | A | A | A | A | A | A | A |
| Dry-wet alternating adhesiveness |  | 8 | 8 | 10 | 10 | 10 | 6 | 6 | 8 |
| Drying property of coating film |  | 5 | 5 | 4 | 4 | 5 | 5 | 3 | 4 |

TABLE 5

|  |  | Examples | | | | | |
| --- | --- | --- | --- | --- | --- | --- | --- |
|  |  | 9 | 10 | 11 | 12 | 13 | 14 |
| Hydrolyzable resin (A) |  | A8 | A8 | A9 | A9 | A8 | A9 |
|  |  | 11.66 | 12.77 | 13.01 | 12.44 | 12.77 | 13.01 |
| Non-hydrolyzable resin (B) |  | B3 | B2 | B4 | B1 | B5 | B6 |
|  |  | 5.81 | 4.80 | 6.26 | 5.44 | 4.61 | 6.14 |
| Non-hydrolyzable resin (C) |  | C8 | C8 | C9 | C8 | C8 | C9 |
|  |  | 5.63 | 5.67 | 3.78 | 5.70 | 5.67 | 3.78 |
| Antifouling | D1 | 41.33 | 41.64 | 34.99 | 41.80 | 41.64 | 34.99 |
| agent (D) | D2 | 4.57 | 3.45 | 4.83 | 3.46 | 3.45 | 4.83 |
|  | D3 |  |  |  |  |  |  |
|  | D4 |  | 0.64 |  | 1.29 | 0.64 |  |
| Rosin compound (E) |  | 1.53 | 1.54 | 1.62 | 1.54 | 1.54 | 1.62 |
| Other | F1 | 13.49 | 13.39 | 13.63 | 14.06 | 13.57 | 13.75 |
| components | F2 | 0.48 | 0.48 | 0.66 | 0.43 | 0.48 | 0.66 |
|  | F3 | 5.26 | 5.30 | 7.20 | 4.69 | 5.30 | 7.20 |
|  | F4 | 8.90 | 8.96 | 12.18 | 7.94 | 8.96 | 12.18 |
|  | F5 | 1.34 | 1.35 | 1.84 | 1.20 | 1.35 | 1.84 |
| Total |  | 100.00 | 100.00 | 100.00 | 100.00 | 100.00 | 100.00 |
| (B)/(A) |  | 0.46 | 0.32 | 0.44 | 0.44 | 0.32 | 0.44 |
| (C)/(A) |  | 0.50 | 0.46 | 0.50 | 0.50 | 0.46 | 0.50 |
| Coating film | After 3 months | 6 | 15 | 17 | 8 | 19 | 17 |
| consumption | After 6 months | 14 | 30 | 32 | 17 | 38 | 32 |
| amount | After 12 months | 33 | 57 | 58 | 38 | 68 | 62 |
| (μm) | After 18 months | 55 | 80 | 80 | 60 | 95 | 90 |
|  | After 24 months | 83 | 95 | 100 | 83 | 120 | 115 |
| Antifouling | 6 months | 5 | 5 | 5 | 5 | 5 | 4 |
| property | 12 months | 5 | 4 | 5 | 5 | 5 | 3 |
| Storage stability |  | A | A | A | A | A | A |
| Dry-wet alternating adhesiveness |  | 10 | 10 | 10 | 10 | 6 | 10 |
| Drying property of coating film |  | 5 | 5 | 4 | 5 | 5 | 3 |

TABLE 6

| | | Examples | | | | | |
|---|---|---|---|---|---|---|---|
| | | 15 | 16 | 17 | 18 | 19 | 20 |
| Hydrolyzable resin (A) | | A8 | A4 | A8 | A10 | A4 | A8 |
| | | 11.67 | 12.71 | 12.98 | 13.62 | 12.71 | 12.98 |
| Non-hydrolyzable resin (B) | | B8 | B9 | B2 | B8 | B9 | B2 |
| | | 3.09 | 5.59 | 4.88 | 2.38 | 5.59 | 4.88 |
| Non-hydrolyzable resin (C) | | C1 | C2 | C3 | C4 | C5 | C6 |
| | | 5.70 | 4.49 | 5.77 | 5.74 | 4.34 | 5.38 |
| Antifouling | D1 | 43.23 | 41.22 | 33.85 | 42.12 | 41.21 | 33.85 |
| agent (D) | D2 | 4.78 | 3.42 | 2.34 | 4.66 | 3.42 | 2.34 |
| | D3 | | | | | | |
| | D4 | 0.67 | | | | | |
| Rosin compound (E) | | 1.92 | 1.52 | 1.56 | 1.56 | 1.52 | 1.56 |
| Other | F1 | 14.19 | 13.24 | 13.59 | 13.64 | 13.40 | 13.98 |
| components | F2 | 0.44 | 0.54 | 0.75 | 0.49 | 0.54 | 0.75 |
| | F3 | 4.86 | 5.86 | 8.24 | 5.36 | 5.86 | 8.24 |
| | F4 | 8.21 | 9.92 | 13.93 | 9.07 | 9.92 | 13.93 |
| | F5 | 1.24 | 1.49 | 2.10 | 1.37 | 1.49 | 2.10 |
| Total | | 100.00 | 100.00 | 100.00 | 100.00 | 100.00 | 100.00 |
| (B)/(A) | | 0.46 | 0.37 | 0.32 | 0.32 | 0.37 | 0.32 |
| (C)/(A) | | 0.52 | 0.35 | 0.46 | 0.46 | 0.35 | 0.46 |
| Coating film | After 3 months | 7 | 15 | 11 | 16 | 12 | 20 |
| consumption | After 6 months | 16 | 27 | 23 | 27 | 24 | 41 |
| amount | After 12 months | 38 | 51 | 41 | 50 | 45 | 74 |
| (μm) | After 18 months | 60 | 76 | 62 | 68 | 69 | 102 |
| | After 24 months | 86 | 100 | 95 | 83 | 93 | 125 |
| Antifouling | 6 months | 5 | 5 | 5 | 5 | 5 | 5 |
| property | 12 months | 5 | 5 | 5 | 5 | 5 | 4 |
| Storage stability | | A | A | A | A | A | A |
| Dry-wet alternating adhesiveness | | 8 | 8 | 10 | 8 | 6 | 8 |
| Drying property of coating film | | 5 | 4 | 4 | 4 | 3 | 3 |

TABLE 7

| | | Examples | | | | | |
|---|---|---|---|---|---|---|---|
| | | 21 | 22 | 23 | 24 | 25 | 26 |
| Hydrolyzable resin (A) | | A10 | A10 | A10 | A10 | A10 | A10 |
| | | 12.12 | 16.18 | 13.55 | 14.77 | 17.02 | 11.98 |
| Non-hydrolyzable resin (B) | | B8 | B9 | B9 | B9 | B9 | B9 |
| | | 2.64 | 1.92 | 6.31 | 3.50 | 0.96 | 6.66 |
| Non-hydrolyzable resin (C) | | C9 | C9 | C9 | C9 | C9 | C9 |
| | | 4.02 | 3.66 | 3.62 | 3.65 | 3.67 | 3.64 |
| Antifouling | D1 | 47.08 | 42.39 | 41.88 | 42.29 | 42.45 | 42.11 |
| agent (D) | D2 | 4.65 | 4.69 | 4.63 | 4.68 | 4.69 | 4.65 |
| | D3 | | | | | | |
| | D4 | | | | | | |
| Rosin compound (E) | | | 1.57 | 0.77 | 1.56 | 1.57 | 1.56 |
| Other | F1 | 13.10 | 13.21 | 13.05 | 13.18 | 13.23 | 13.12 |
| components | F2 | 0.40 | 0.49 | 0.49 | 0.49 | 0.49 | 0.49 |
| | F3 | 4.41 | 5.40 | 5.33 | 5.38 | 5.40 | 5.36 |
| | F4 | 7.45 | 9.13 | 9.02 | 9.10 | 9.14 | 9.06 |
| | F5 | 1.12 | 1.38 | 1.36 | 1.37 | 1.38 | 1.37 |
| Total | | 100.00 | 100.00 | 100.00 | 100.00 | 100.00 | 100.00 |
| (B)/(A) | | 0.32 | 0.11 | 0.42 | 0.22 | 0.05 | 0.51 |
| (C)/(A) | | 0.46 | 0.39 | 0.46 | 0.43 | 0.37 | 0.52 |
| Coating film | After 3 months | 6 | 6 | 12 | 12 | 5 | 15 |
| consumption | After 6 months | 13 | 20 | 22 | 25 | 13 | 28 |
| amount | After 12 months | 30 | 51 | 36 | 52 | 33 | 51 |
| (μm) | After 18 months | 51 | 83 | 55 | 77 | 58 | 69 |
| | After 24 months | 74 | 110 | 83 | 105 | 83 | 86 |
| Antifouling | 6 months | 4 | 5 | 5 | 5 | 5 | 4 |
| property | 12 months | 3 | 5 | 4 | 5 | 5 | 3 |
| Storage stability | | A | A | A | A | A | A |
| Dry-wet alternating adhesiveness | | 10 | 8 | 10 | 10 | 10 | 8 |
| Drying property of coating film | | 5 | 4 | 5 | 5 | 3 | 5 |

TABLE 8

|  |  | Examples | | | | | |
| --- | --- | --- | --- | --- | --- | --- | --- |
|  |  | 27 | 28 | 29 | 30 | 31 | 32 |
| Hydrolyzable resin (A) | | A8 | A8 | A8 | A8 | A8 | A8 |
| | | 17.88 | 11.37 | 16.51 | 12.66 | 18.82 | 10.85 |
| Non-hydrolyzable resin (B) | | B2 | B8 | B8 | B8 | B8 | B8 |
| | | 4.73 | 2.38 | 2.37 | 2.38 | 2.37 | 2.38 |
| Non-hydrolyzable resin (C) | | C8 | C8 | C8 | C8 | C8 | C8 |
| | | 0.95 | 7.14 | 2.56 | 5.99 | 0.50 | 7.54 |
| Antifouling | D1 | 41.05 | 42.12 | 42.05 | 42.11 | 42.02 | 42.13 |
| agent (D) | D2 | 3.40 | 3.49 | 3.49 | 3.49 | 3.48 | 3.49 |
| | D3 | | | | | | |
| | D4 | | | | | | |
| Rosin compound (E) | | 1.52 | 1.56 | 1.55 | 1.56 | 1.55 | 1.56 |
| Other | F1 | 12.72 | 13.73 | 13.29 | 13.62 | 13.10 | 13.84 |
| components | F2 | 0.53 | 0.55 | 0.55 | 0.55 | 0.55 | 0.55 |
| | F3 | 5.84 | 5.99 | 5.98 | 5.99 | 5.98 | 5.99 |
| | F4 | 9.88 | 10.13 | 10.12 | 10.13 | 10.11 | 10.14 |
| | F5 | 1.49 | 1.53 | 1.52 | 1.53 | 1.52 | 1.53 |
| Total | | 100.00 | 100.00 | 100.00 | 100.00 | 100.00 | 100.00 |
| (B)/(A) | | 0.22 | 0.36 | 0.25 | 0.32 | 0.22 | 0.38 |
| (C)/(A) | | 0.05 | 0.65 | 0.16 | 0.49 | 0.03 | 0.72 |
| Coating film | After 3 months | 4 | 13 | 6 | 15 | 4 | 22 |
| consumption | After 6 months | 10 | 25 | 14 | 30 | 10 | 43 |
| amount | After 12 months | 25 | 50 | 31 | 56 | 23 | 77 |
| (μm) | After 18 months | 43 | 77 | 51 | 79 | 37 | 103 |
| | After 24 months | 60 | 110 | 79 | 100 | 53 | 127 |
| Antifouling | 6 months | 5 | 5 | 5 | 5 | 5 | 5 |
| property | 12 months | 5 | 5 | 5 | 5 | 4 | 5 |
| Storage stability | | A | A | A | A | A | A |
| Dry-wet alternating adhesiveness | | 8 | 10 | 10 | 10 | 6 | 10 |
| Drying property of coating film | | 5 | 4 | 5 | 5 | 5 | 3 |

TABLE 9

|  |  | Examples | | | | | |
| --- | --- | --- | --- | --- | --- | --- | --- |
|  |  | 33 | 34 | 35 | 36 | 37 | 38 |
| Hydrolyzable resin (A) | | A9 | A9 | A9 | A9 | A9 | A9 |
| | | 18.21 | 9.37 | 14.69 | 13.15 | 18.20 | 6.74 |
| Non-hydrolyzable resin (B) | | B10 | B10 | B10 | B10 | B10 | B10 |
| | | 3.18 | 1.64 | 2.57 | 2.30 | 3.18 | 1.18 |
| Non-hydrolyzable resin (C) | | C8 | C8 | C8 | C8 | C8 | C8 |
| | | 7.75 | 3.95 | 6.23 | 5.53 | 7.74 | 2.85 |
| Antifouling | D1 | | 63.74 | 29.07 | 47.17 | | 59.56 |
| agent (D) | D2 | | 7.01 | 1.88 | 3.37 | | 12.86 |
| | D3 | 0.07 | 0.03 | 0.03 | 0.03 | 0.04 | 0.03 |
| | D4 | | | | | | 0.86 |
| Rosin compound (E) | | 2.08 | 1.07 | 1.68 | 1.50 | 2.08 | 0.77 |
| Other | F1 | 16.55 | 11.64 | 14.66 | 13.17 | 16.54 | 11.85 |
| components | F2 | 1.57 | 0.05 | 0.84 | 0.42 | 1.57 | 0.10 |
| | F3 | 17.17 | 0.52 | 9.15 | 4.54 | 17.19 | 1.09 |
| | F4 | 29.04 | 0.87 | 15.47 | 7.67 | 29.08 | 1.84 |
| | F5 | 4.38 | 0.13 | 2.33 | 1.16 | 4.38 | 0.28 |
| Total | | 100.00 | 100.00 | 100.00 | 100.00 | 100.00 | 100.00 |
| (B)/(A) | | 0.32 | 0.32 | 0.32 | 0.32 | 0.32 | 0.32 |
| (C)/(A) | | 0.46 | 0.46 | 0.46 | 0.46 | 0.46 | 0.46 |
| Coating film | After 3 months | 9 | 14 | 10 | 11 | 7 | 20 |
| consumption | After 6 months | 19 | 28 | 18 | 22 | 16 | 34 |
| amount | After 12 months | 41 | 54 | 38 | 46 | 36 | 60 |
| (μm) | After 18 months | 64 | 78 | 63 | 71 | 60 | 85 |
| | After 24 months | 91 | 98 | 90 | 94 | 86 | 103 |
| Antifouling | 6 months | 4 | 5 | 5 | 5 | 3 | 5 |
| property | 12 months | 4 | 5 | 5 | 5 | 3 | 5 |
| Storage stability | | A | B | A | A | A | C |
| Dry-wet alternating adhesiveness | | 10 | 10 | 10 | 10 | 10 | 8 |
| Drying property of coating film | | 5 | 5 | 5 | 5 | 5 | 4 |

TABLE 10

| | | Examples | | | | | | | |
|---|---|---|---|---|---|---|---|---|---|
| | | 1 | 2 | 3 | 4 | 5 | 6 | 7 | 8 |
| Hydrolyzable resin (A) | | | A10 | A9 | A10 | A10 | A10 | A10 | A10 |
| | | | 16.09 | 12.44 | 20.59 | 13.86 | 13.62 | 13.62 | 13.62 |
| Non-hydrolyzable resin (B) | | B18 | | | B7 | B8 | B8 | B8 | B6 | B7 |
| | | 6.94 | | | 5.98 | 3.35 | 2.42 | 2.38 | 4.68 | 4.78 |
| Non-hydrolyzable resin (C) | | C9 | C9 | C8 | | C10 | C7 | C2 | C1 |
| | | 7.96 | 4.74 | 5.70 | | 3.53 | 5.35 | 5.74 | 5.54 |
| Antifouling | D1 | 46.10 | 42.89 | 41.80 | 41.33 | 42.85 | 42.12 | 42.12 | 42.12 |
| agent (D) | D2 | 5.10 | 4.74 | 3.46 | 4.57 | 4.74 | 4.66 | 4.66 | 4.66 |
| | D3 | | | | | | | | |
| | D4 | | | 1.29 | | | | | |
| Rosin compound (E) | | 1.70 | 1.59 | 1.54 | 1.53 | 1.58 | 1.56 | 1.56 | 1.56 |
| Other | F1 | 14.37 | 13.37 | 13.52 | 12.65 | 14.45 | 14.03 | 11.34 | 11.43 |
| components | F2 | 0.54 | 0.50 | 0.43 | 0.48 | 0.50 | 0.49 | 0.49 | 0.49 |
| | F3 | 5.87 | 5.46 | 4.69 | 5.26 | 5.45 | 5.36 | 5.36 | 5.36 |
| | F4 | 9.92 | 9.23 | 7.94 | 8.90 | 9.22 | 9.07 | 9.07 | 9.07 |
| | F5 | 1.50 | 1.39 | 1.20 | 1.34 | 1.39 | 1.37 | 1.37 | 1.37 |
| Total | | 100.00 | 100.00 | 100.00 | 100.00 | 100.00 | 100.00 | 100.00 | 100.00 |
| (B)/(A) | | — | 0.00 | 0.44 | 0.30 | 0.32 | 0.32 | 0.32 | 0.32 |
| (C)/(A) | | — | 0.51 | 0.50 | 0.00 | 0.46 | 0.46 | 0.46 | 0.46 |
| Coating film | After 3 months | 30 | 13 | 4 | 2 | 1 | 4 | 20 | 5 |
| consumption | After 6 months | 68 | 30 | 10 | 5 | 3 | 10 | 45 | 13 |
| amount | After 12 months | 152 | 76 | 26 | 12 | 8 | 22 | 89 | 33 |
| (μm) | After 18 months | 253 | 160 | 48 | 22 | 15 | 38 | 127 | 59 |
| | After 24 months | 363 | 290 | 80 | 38 | 25 | 65 | 160 | 92 |
| Antifouling | 6 months | 1 | 4 | 3 | 2 | 2 | 4 | 3 | 3 |
| property | 12 months | 1 | 4 | 2 | 1 | 1 | 2 | 1 | 1 |
| Storage stability | | A | A | A | A | A | A | A | A |
| Dry-wet alternating adhesiveness | | 6 | 2 | 4 | 0 | 10 | 8 | 10 | 10 |
| Drying property of coating film | | 1 | 3 | 1 | 5 | 5 | 3 | 2 | 2 |

Reference Signs List

10: water passage
20: test plate
30: flow direction of natural seawater

What is claimed is:

1. An antifouling coating composition comprising a hydrolyzable resin (A), a first non-hydrolyzable resin (B), a second non-hydrolyzable resin (C), and an antifouling agent (D), wherein
a glass transition temperature $Tg_B$ ° C. and a solubility parameter $SP_B$ of the first non-hydrolyzable resin (B), and a glass transition temperature $Tg_C$ ° C. and a solubility parameter $SP_C$ of the second non-hydrolyzable resin (C) satisfy following expressions [1] to [4]:

$$Tg_B - Tg_C \geq 60 \quad [1]$$

$$10.5 \geq SP_B \geq 9.5 \quad [2]$$

$$10.6 \geq SP_C 9.5 \quad [3]$$

$$|SP_B - SP_C| \geq 1.0 \quad [4],$$

and wherein
the $Tg_B$ is in a range of greater than or equal to 40° C. and less than or equal to 80° C.

2. The antifouling coating composition according to claim 1, wherein the $SP_B$ is in a range of greater than or equal to 9.6 and less than or equal to 10.3.

3. The antifouling coating composition according to claim 1, wherein the $Tg_C$ is in a range of greater than or equal to −50° C. and less than or equal to −20° C., and the $SP_C$ is in a range of greater than or equal to 9.8 and less than or equal to 10.6.

4. The antifouling coating composition according to claim 1, wherein the hydrolyzable resin (A) has a glass transition temperature $Tg_A$ in a range of greater than or equal to 10° C. and less than or equal to 80° C., and a solubility parameter $SP_A$ in a range of greater than or equal to 8.5 and less than or equal to 9.7.

5. The antifouling coating composition according to claim 1, wherein the hydrolyzable resin (A) has a silicon atom-containing group represented by a following formula (1):

[Chemical formula 1]

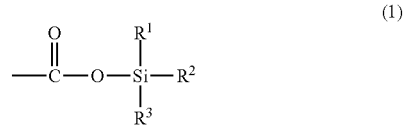

(1)

wherein the formula (1), $R^1$, $R^2$, and $R^3$ each independently represent a C1 to C6 hydrocarbon group.

6. The antifouling coating composition according to claim 1, further comprising a rosin compound (E).

7. The antifouling coating composition according to claim 1, wherein a content ratio of the first non-hydrolyzable resin (B) to the hydrolyzable resin (A) is greater than or equal to 0.1 and less than or equal to 0.45 in terms of mass ratio.

8. The antifouling coating composition according to claim 1, wherein a content ratio of the second non-hydrolyzable resin (C) to the hydrolyzable resin (A) is greater than or equal to 0.05 and less than or equal to 0.65 in terms of mass ratio.

9. The antifouling coating composition according to claim 1, wherein a content of the antifouling agent (D) is greater than or equal to 0.3 parts by mass and less than or equal to 550 parts by mass, based on 100 parts by mass of the hydrolyzable resin (A).

10. A coating film formed from the antifouling coating composition according to claim 1.

11. A ship comprising the coating film according to claim 10.

12. An underwater structure comprising the coating film according to claim 10.

* * * * *

UNITED STATES PATENT AND TRADEMARK OFFICE
CERTIFICATE OF CORRECTION

PATENT NO. : 11,472,967 B1
APPLICATION NO. : 17/607158
DATED : October 18, 2022
INVENTOR(S) : Wataru Kitamura, Soichiro Tomiyama and Yasuhisa Nagase It is certified that error appears in the above-identified patent and that said Letters Patent is hereby corrected as shown below:

In the Specification

Column 11, Line 65, please change "$|SP_B - SP_C| \geq 1.0$ [4]" to --$|SP_B - SP_C| \leq 1.0$ [4]--

In the Claims

Column 31, Claim 1, Line 54, please change "$|SP_B - SP_C| \geq 1.0$ [4]" to --$|SP_B - SP_C| \leq 1.0$ [4]--

Signed and Sealed this
Eighteenth Day of July, 2023

Katherine Kelly Vidal
*Director of the United States Patent and Trademark Office*